No. 673,700. Patented May 7, 1901.
W. P. CHERRINGTON.
TRUCK FOR CARRYING BARRELS, &c.
(Application filed Aug. 25, 1900.)

(No Model.) 2 Sheets—Sheet 1.

Witnesses
Joseph F. Dean
Elmer B. Shaw

Inventor.
William P. Cherrington

No. 673,700. Patented May 7, 1901.
W. P. CHERRINGTON.
TRUCK FOR CARRYING BARRELS, &c.
(Application filed Aug. 25, 1900.)

(No Model.) 2 Sheets—Sheet 2.

Witnesses.
Joseph F. Dean
Elmer B. Shaw

Inventor.
William P. Cherrington

UNITED STATES PATENT OFFICE.

WILLIAM P. CHERRINGTON, OF BOSTON, MASSACHUSETTS.

TRUCK FOR CARRYING BARRELS, &c.

SPECIFICATION forming part of Letters Patent No. 673,700, dated May 7, 1901.

Application filed August 25, 1900. Serial No. 28,047. (No model.)

*To all whom it may concern:*

Be it known that I, WILLIAM P. CHERRINGTON, of Boston, in the county of Suffolk and State of Massachusetts, have invented certain new and useful Improvements in Trucks for Carrying Barrels, Tierces, and Similar Objects, of which the following is a specification.

The object of my invention is to furnish a hand-truck upon which the truckman can load without assistance heavy barrels, tierces, and other similar objects while lying on their bilge ands o arranged as to bring an equal pressure on all parts of the periphery at the same time and without marring the same with sharp prongs or hooks, the truck having wheels sufficiently high to transport the load with ease over any ordinary surface or incline.

Figure 1:
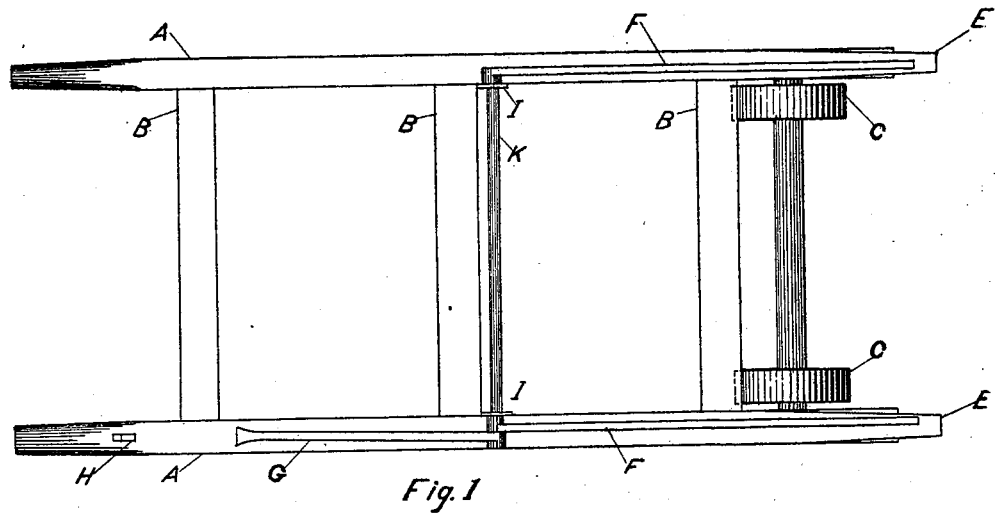
Figure 2:
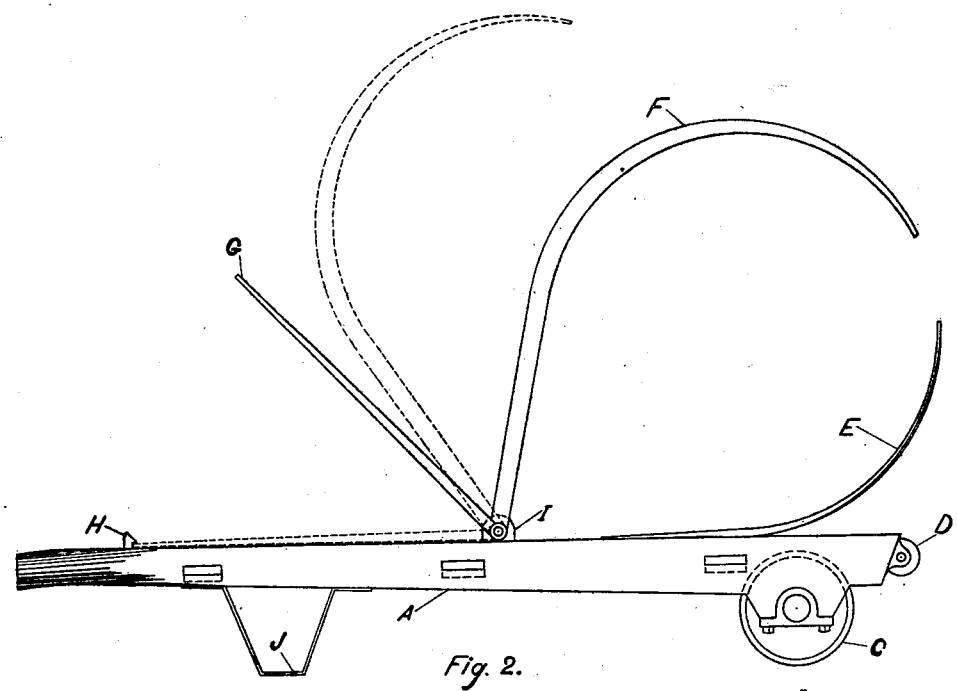
Figure 3:
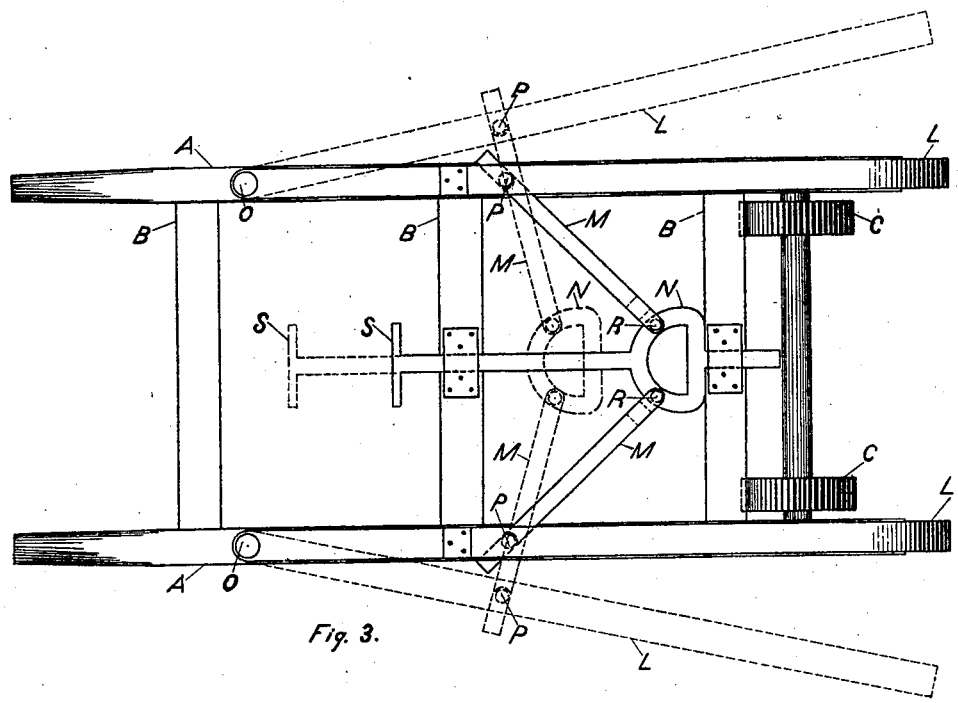
Figure 4:
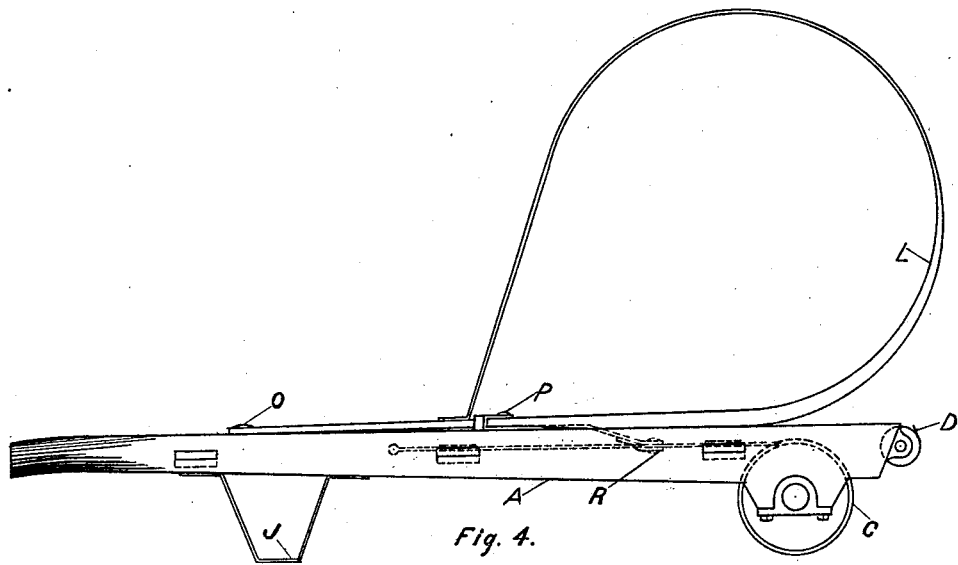

In the accompanying drawings, Figure 1 is a horizontal view of the truck. Fig. 2 is a side view of the same. Figs. 3 and 4 show a plan and side elevation of a modified form of the truck.

A A are the shafts, running parallel.

B B B are the cross-bars; C C, the wheels of the truck.

D is a small wheel attached to the outer end of each shaft, to be used when the truck is in a perpendicular position.

E E are curved levers or clamps made to pass under the barrel when the truck is in an upright position by moving it forward on the wheels D.

F F are clamps connected by the rod K and attached firmly to the handle G and are pivoted in the socket I I.

H is a latch to hold the handle G when the clamps F F are raised.

J J are the legs upon which the truck rests.

By having the shafts parallel and placing the wheels inside, the levers or clamps E E are carried farther from the center of the barrel than can be done with the ordinary truck when the distance between the shafts is narrowed at the loading end, with the wheels on the outside.

In Figs. 3 and 4 are shown bands made to conform to the periphery of the barrel or tierce. These bands are pivoted to the shafts at O and are operated by the slide S, to which are attached the arms M M by the pivots P P and R R. By pulling the slide S forward the bands L L are thrown open, and when the truck is in an upright position they are passed under the ends of the barrel by the truckman with the pressure of his foot on that part of the slide marked N, thus completely surrounding both ends with an equal pressure on all parts of the periphery, when the barrel can be lifted without danger of injury by bringing the shafts into a horizontal position.

What I claim as my invention is—

1. In a hand-truck for carrying barrels, tierces or other similar objects, the combination with the truck of levers or clamps connected therewith to completely surround the barrel, tierce or other similar object, while lying on its bilge and so arranged that the levers or clamps will conform to the periphery of the barrel, tierce or other similar object, so as to equalize the pressure due to the weight of the same.

2. In a hand-truck for carrying barrels, tierces or other similar objects, surrounding clamps made to conform to the periphery of the barrel, tierce or other similar object, and adjustable to pass longitudinally over the head of the same while lying on its bilge.

3. Surrounding clamps made to conform to the periphery of the barrel, tierce or other similar object, adjustable to swing laterally with the hand-truck from a pivot or hinge thereon, and pass around the end of the barrel, tierce or other similar object while lying on its bilge.

In testimony whereof I have affixed my signature in presence of two witnesses.

WILLIAM P. CHERRINGTON.

Witnesses:
 G. N. RICHARDS,
 E. L. MINOR.